United States Patent
Zhou et al.

(10) Patent No.: US 9,781,733 B2
(45) Date of Patent: Oct. 3, 2017

(54) METHOD, SYSTEM AND CENTRAL UNIT FOR ORGANIZING RANDOM ACCESS RESOURCES

(71) Applicant: Huawei Technologies Duesseldorf GmbH, Dusseldorf (DE)

(72) Inventors: Chan Zhou, Munich (DE); Yunyan Chang, Shenzhen (CN); Oemer Bulakci, Munich (DE)

(73) Assignee: HUAWEI TECHNOLOGIES DUESSELDORF GMBH, Dusseldorf (DE)

( * ) Notice: Subject to any disclaimer, the term of this patent is extended or adjusted under 35 U.S.C. 154(b) by 0 days.

(21) Appl. No.: 15/094,663

(22) Filed: Apr. 8, 2016

(65) Prior Publication Data
US 2016/0227554 A1 Aug. 4, 2016

Related U.S. Application Data

(63) Continuation of application No. PCT/EP2013/071362, filed on Oct. 11, 2013.

(51) Int. Cl.
*H04W 72/10* (2009.01)
*H04W 48/06* (2009.01)
*H04W 72/04* (2009.01)
*H04W 74/00* (2009.01)
*H04W 72/12* (2009.01)
*H04W 74/08* (2009.01)
*H04W 4/00* (2009.01)

(52) U.S. Cl.
CPC ........... *H04W 72/10* (2013.01); *H04W 48/06* (2013.01); *H04W 72/0406* (2013.01); *H04W 72/121* (2013.01); *H04W 74/006* (2013.01); *H04W 74/08* (2013.01); *H04W 4/005* (2013.01)

(58) Field of Classification Search
CPC .......................... H04W 72/0406; H04W 72/10
USPC .......... 455/452.1, 452.2, 509, 517, 519, 520
See application file for complete search history.

(56) References Cited

U.S. PATENT DOCUMENTS

| 2012/0082088 A1* | 4/2012 | Dalsgaard | H04L 12/4625 370/315 |
| 2012/0147843 A1* | 6/2012 | Pison | H04L 5/0044 370/330 |

(Continued)

FOREIGN PATENT DOCUMENTS

| WO | WO 2012/056209 A1 | 5/2012 |
| WO | WO 2013/009380 A1 | 1/2013 |

OTHER PUBLICATIONS

"3rd Generation Partnership Project; Technical Specification Group Radio Access Network; Study on RAN Improvements for Machine-type Communications; (Release 11)", 3GPP TR 37.868 V11.0.0, Sep. 2011, 28 pages.

*Primary Examiner* — John J Lee

(57) ABSTRACT

A method for organizing random access (RA) resources, comprising: forming a device group including a plurality of group members and at least one group representative; providing the at least one group representative with priority access to RA resources; sending, by the at least one group representative, a primary event message to a central unit in said RA resources; and sending, by the central unit, a response message, responsive to the primary event message, to the group members for managing access of the group members to the RA resources.

13 Claims, 8 Drawing Sheets

(56) References Cited

U.S. PATENT DOCUMENTS

| | | |
|---|---|---|
| 2013/0155864 A1 | 6/2013 | Yoshizawa et al. |
| 2013/0174277 A1* | 7/2013 | Kiukkonen .......... H04L 63/104 726/28 |
| 2015/0271791 A1* | 9/2015 | Webb .................... H04W 4/005 370/230 |

* cited by examiner

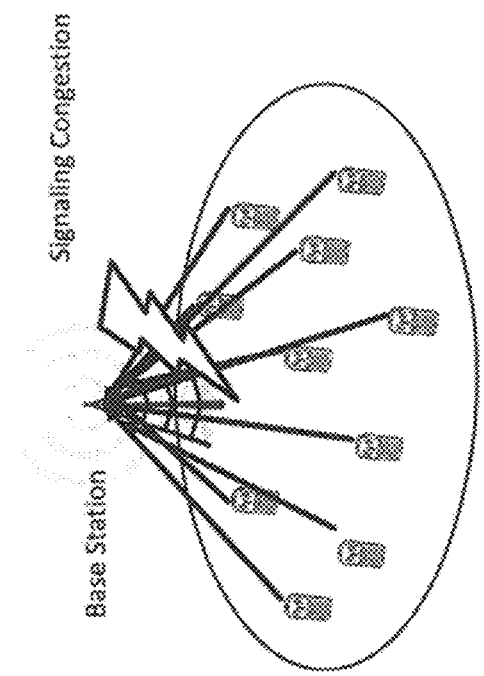
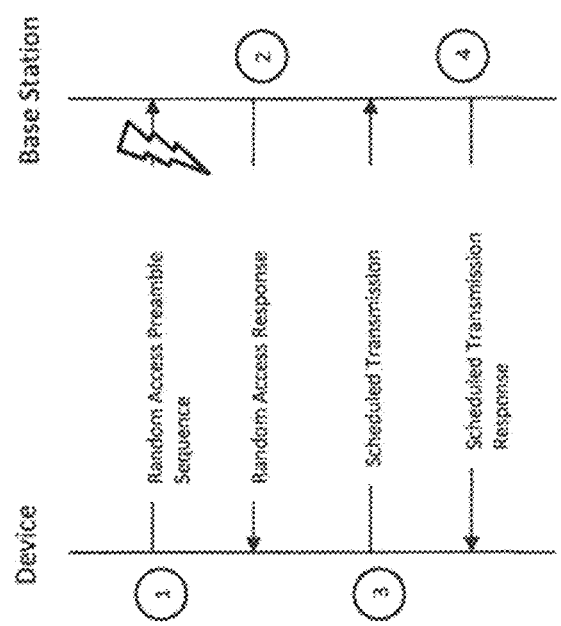
Fig. 1

METHOD, SYSTEM AND CENTRAL UNIT FOR ORGANIZING RANDOM ACCESS RESOURCES

CROSS-REFERENCE TO RELATED APPLICATION

This application is a continuation of International Application No. PCT/EP2013/071362, filed on Oct. 11, 2013, which is hereby incorporated by reference.

TECHNICAL FIELD

The present invention relates to a method, a system and a central unit for organizing random access (RA) resources. In particular, by organizing RA resources, the method, system and central unit of the present invention are able to reduce the probability of a signaling congestion, which is caused by a simultaneous access to the central unit from a massive number of devices, particularly in the case of devices performing machine-to-machine (M2M) communications. The present invention can, however, be applied to all kinds of devices, including one of or both M2M devices and conventional human-based devices.

BACKGROUND

Due to a wide range of potential applications and new revenue opportunities, M2M communication is arousing increasing interest in recent years, particularly among mobile network operators, vendors, as well as research entities. It is expected that the number of M2M devices connecting to mobile networks will increase significantly in the next couple of years. According to recent statistics, a total of 50 billion connected devices are predicted for the year 2020.

However, the current mobile networks are designed and optimized only for traffic characteristics of human-based communication applications, while M2M communication has substantially different features. For instance, M2M communication is uplink-dominant and employs small-packet transmission with a low data rate. Therefore, the predicted rapid deployment of M2M communication will pose significant challenges to the current mobile networks, in particular when accommodating both human-based and machine-based services of a wide range of characteristics and requirements.

In particular, many types of networks, including said mobile networks, often observe bursty traffic from machine-based communications. Bursty traffic means that many M2M devices are triggered simultaneously, and that a bulk of data traffic is consequently generated in the uplink direction. Such synchronized behavior from a multitude of M2M devices may, for example, be caused by an external event, which triggers the massive number of M2M devices to at once, i.e. simultaneously, request for a connection to a central unit of the network, for example to a base station. As an example, a large number of metering devices may become active almost simultaneously after a period of power outage. As another example, synchronized behavior may be caused by many M2M devices in a mobile network being simultaneously handed over from one base station of the mobile network to another. The simultaneous handover may be caused by a highly synchronized mobility of the M2M devices or by the outage of a base station.

In the state of the art, for requesting a connection of a device to the central unit typically the RA procedure is employed. When a device is triggered by an event, and when the device has information to report to the central unit, the device will initiate the RA procedure to request initial access to the central unit. The RA procedure comprises in particular four steps, which are shown in FIG. 1.

In a first step, the device transmits its identity and the cause of the access request using a randomly selected RA preamble sequence on a Physical Random Access Channel (PRACH) to the central unit, which is in this case a base station. In a second step, the base station detects the preamble sequence, and transmits a RA response on a Physical Downlink Shared Channel (PDSCH) responsive to the detected preamble sequence. In a third step, the device transmits other messages, e.g. a scheduling request, to the base station using Physical Uplink Shared Channel (PUSCH) resources, which are assigned by the base station to the device in the RA response transmitted in the second step. In a fourth step, the base station confirms the messages received in the third step on the PDSCH.

A problem of the above described RA procedure is the limited amount of RA resources, which are typically preamble sequences. For example, in LTE-Advanced and LTE, each cell of a mobile network is assigned only 64 preamble sequences. Even more severe, among those 64 preamble sequences, only a limited number can be utilized for the RA procedure. Therefore, the probability of a collision is high, in particular when many devices initiate a RA procedure at the same time. A collision will occur, if two or more devices have selected the same preamble sequence.

In case M2M communication is used in a network, the number of devices, which simultaneously attempt to access the central unit of the network, wherein the devices may include both User Equipments (UEs), i.e. human-based devices, and M2M devices, can increase sharply, particularly due to bursty traffic of the M2M devices. Bursty traffic of a large number of M2M devices will inevitably lead to an overload of the central unit of the network, and will also increase the probability of collisions in the above-described first step of the RA procedure. As a consequence, a severe signaling congestion can occur in the PRACH.

The messages, which are the cause of and have to be dealt with during a signaling congestion, can be classified into two categories. The first category concerns redundant messages, i.e. messages containing the same relevant information, which are sent repeatedly by different devices. In other words, the transmission of a message by a certain device is unnecessary, if the same message or a message containing the same content has already been transmitted to the central unit by one or more of the other devices. An example for the occurrence of such redundant messages is multiple handover requests, which are sent by a group of tracking tags provided in the same vehicle. The second category concerns diverse messages, i.e. different messages transmitted synchronously. An example for such diverse messages is the transmission of diverse impact sensors in case of a car crash. Another example is a high number of metering devices becoming active almost simultaneously after a period of power outage.

If, on the one hand side, redundant messages are not properly handled in the case of a signaling congestion, the devices may initiate requests for sending messages with the same or a different central unit of the network at the next time slot, or even over and over again each time slot. Thereby, the signaling congestion is even worsened, which should necessarily be avoided. If, on the other hand side, many devices try to transmit diverse messages, the central unit is significantly challenged due to a limited amount of PUSCH resources, the amount being insufficient for the large number of received transmission requests.

In 3GPP TR 37.868 V11.0.0, "Study on RAN Improvements for Machine-Type Communications", September 2011, the state of the art proposes six solutions for improving the RA procedure, particularly for dealing with the above-described signaling congestion and with an overload of a central unit of a network in case of M2M communications.

The first solution is the Back off Scheme, wherein the RA procedure of some M2M devices is delayed for a certain number of time slots.

The second solution is the Slotted Access Scheme, wherein each M2M device is only allowed to transmit the RA preamble sequence at specific slots within specific radio frames.

The third solution is the Access Class Barring (ACB) Scheme, wherein a base station can bar or delay a M2M device from reinitiating its RA procedure.

The fourth solution is RACH Resource Separation, wherein human-based and machine-based devices are allocated orthogonal RACH resources.

The fifth solution is the Pull-based Scheme, wherein the M2M devices initiate the RA procedure upon receiving a paging signal from a base station, which is triggered by a M2M server.

The sixth solution is Dynamic Allocation of RACH Resources, wherein the base station dynamically allocates additional RACH resources based on a RACH load condition and on the overall traffic load.

However, the general idea of all these solutions is to instruct the M2M devices with a proper back off time, in order that the M2M devices reinitiate their connection or attach request to the central unit using proper RA resources. None of the proposed solutions properly addresses the major cause for bursty M2M traffic, namely a synchronized behavior of a large number of highly correlated M2M devices. For instance, a plurality of devices in proximity to each other may all be triggered by a common event, for example a tsunami, an earthquake, a blaze or the like. A plurality of M2M devices may also become active after a period of power outage.

SUMMARY

In view of the above described problems caused by bursty traffic of M2M devices, the present invention aims for a suitable control mechanism for protecting a central unit of a network from a severe collapse in case of a signaling congestion and/or an overload. The object of the present invention is therefore to provide a method, a system and a central unit for organizing RA resources, in order to prevent a signaling congestion. The present invention understands that a signaling congestion may result from a limited number of RA resources, and may also result from a limited number of PUSCH resources. The underlying main problem is recurring transmissions of redundant messages, when the network is simultaneously accessed by a large number of devices.

Therefore, the present invention aims in particular to make efficient use of the available RA resources, in order to support a large number of devices, which simultaneously request access to a central unit of a network. Further, the present invention shall effectively avoid unnecessary recurring transmissions of redundant messages. In addition, the present invention aims to optimize the use of available PUSCH resources, in order to support devices transmitting diverse messages.

The above-mentioned object is achieved by the solution provided in the enclosed independent claims. Advantageous implementations are defined in the respective dependent claims. In particular, according to the claimed method, system and central unit, respectively, the probability of a signaling congestion caused by simultaneous access to a central unit from a large number of devices is significantly reduced.

A first aspect of the present invention provides a method for organizing RA resources. The method comprises forming a device group including a plurality of group members and at least one group representative; providing the at least one group representative with priority access to RA resources; sending, by the at least one group representative, a primary event message to a central unit in said RA resources; and sending, by the central unit, a response message, responsive to the primary event message, to the group members for managing access of the group members to the RA resources.

The group members and the at least one group representatives can be devices like M2M devices, human-based devices, e.g. UEs, mobile terminals, mobile phones, various kinds of sensors, e.g. for vibration, impact, pressure, airflow, fire or the like. The central unit can be a main controller of the network, a base station, a base terminal or the like.

The main advantage of the method according to the first aspect of the present invention is a reduction of the risk of signaling congestion. The reduced risk of signaling congestion can be achieved, because the one or more group representatives are only of limited number, and are furthermore provided with sufficient RA resources. Moreover, the RA resources of the group members can be effectively managed, and thus a collision with the at least one group representatives can be prevented, which reduces the risk of signaling congestion even further. Moreover, due to the priority access of the at least one group representative to the RA resources, the at least one group representative can either always be connected via the RA resources to the central unit, or can be at least connected with a higher probability than the group members and devices in the prior art. Thus, the method is very reliable, i.e. the central unit reliably receives the primary event message indicating a certain event.

The RA resource organizing method of the present invention can, for example, be applied to reduce a signaling congestion and a network overload probability, which are caused by integrating M2M communication into a cellular mobile network. In this case, the group members are multiple M2M devices having similar features. A plurality of M2M devices can be assorted into the at least one device group. One or more of the M2M devices can be assigned as at least one group representative. The central unit is preferably a base station of the mobile network. The assigned one or more group representatives can, for example, use reserved RA resources to send the primary event message. The primary event message indicates, for example, a necessary simultaneous base station handover of a device group, for instance caused by a defective base station or a power outage. The response message, which the central unit sends to the group members, can be a broadcast-message, a multi-message or a uni-message.

In a first implementation form of the method according to the first aspect, a predetermined amount of the RA resources is reserved for the at least one group representative in order to provide the at least one group representative with the priority access.

Each group representative is preferably preconfigured to use a specific reserved RA resource, in which it sends its primary event message. The central unit is preferably configured to identify that an event message comes from a group representative based on the used RA resources. By providing the reserved RA resources, the probability for the at least one group representative to obtain RA resources for sending the primary event message can at least be increased. Obtaining RA resources can even be guaranteed, when one RA preamble sequence is reserved for each group representative. Collisions between multiple group representatives can be avoided, and the method can therefore ensure that an occurring event is reliably reported to the central unit by at least one primary event message.

In a second implementation form of the method according to the first aspect as such or according to the first implementation form of the first aspect, at least one RA preamble sequence is reserved for the at least one group representative.

RA preamble sequences are an easy way to reserve RA resources, and provide compatibility of the method of the present invention with existing standardization. Each RA preamble sequence can also be considered as a kind of radio resource. Each RA preamble sequence can be provided to one group representative, but may also be shared by a plurality of group representatives, preferably from the same device group.

In a third implementation form of the method according to the first aspect as such or according to any of the previous implementation forms of the first aspect, the response message includes the primary event message, and requesting access to the RA resources for sending a secondary event message is stopped by a group member if the secondary event message corresponds to the primary event message.

Each group member, which is triggered by an event, may attempt to send an own event message, i.e. the secondary event message. However, the secondary event message from a certain group member is only beneficial, if its information differs from the information in the primary event message. If the secondary event message of a group member corresponds in its information content to the information content of the primary event message, it is unnecessary. By stopping the request for RA resources, the risk of signaling congestion can be largely reduced, without sacrificing information on the event. In particular, the method of the present invention can avoid that unnecessary event messages are sent to the central unit. Thereby, also an overload of the central unit can be avoided.

In a fourth implementation form of the method according to the third implementation form of the first aspect, a redundancy check is performed by each group member in order to determine whether the secondary event message is redundant with or is of the same type as the primary event message, and requesting access to the RA resources is stopped by a group member if its redundancy check is positive.

By performing the redundancy check, each group member is able to determine, whether its own secondary event message is redundant or is of the same type, and is thus unnecessary. Consequently, the sending thereof can be stopped without a loss of information at the central unit.

In a fifth implementation form of the method according to the first aspect as such or according to any of the previous implementation forms of the first aspect, at least one secondary event message from at least one group member is detected by the at least one group representative, and the at least one secondary event message is attached by the at least one group representative to the primary event message, the response message includes the primary event message and the at least one secondary event message, and requesting access to the RA resources for sending a secondary event message is stopped by a group member, if its secondary event message is included in the response message.

Each group member may attempt to send a secondary event message in case of an event. Thus, the at least one group representative can, for example, detect one secondary event message from one group member, or one secondary event message from each of multiple group members, respectively, i.e. a plurality of secondary event messages from a plurality of group members. The at least one group representative can include all or only some of the detected secondary event messages into the primary event message. The central unit can likewise include all or only some of the secondary event messages in the response message. Each group member, which finds that its own secondary event message is included in the response message, is configured to stop its request for RA resources, in order to avoid collisions and a resulting signaling congestion.

In a sixth implementation form of the method according to the fifth implementation form of the first aspect, the at least one secondary event message of the at least one group member is listened by the at least one group representative, or the at least one secondary event message is detected by the at least one group representative via dedicated communication interfaces between the at least one group representative and the group members.

The listening is preferably carried out on the signaling channel, over which a certain group member attempts to send its secondary event message. No dedicated channel is required for this first alternative. The first alternative is thus less complicated, and requires fewer channels and consequently hardware components. The second alternative increases the effectiveness in detecting the secondary event messages, and can in particular increase the speed of the detection.

In a seventh implementation form of the method according to the first aspect as such or according to any of the previous implementation forms of the first aspect, the response message includes scheduling information for scheduling at least one selected group member for access to the RA resources.

By scheduling the RA resources, the selected (scheduled) group members can be provided with a higher probability to access RA resources. Preferably, each selected group member is even provided with a guaranteed access to RA resources. Collisions between the at least one group representative and the selected group members can be avoided, when access to RA resources is requested. Also collisions between selected group members and not selected other group members can be avoided. Thereby, the risk for a signaling congestion can be reduced or a signaling congestion can even be prevented.

In an eighth implementation form of the method according to the seventh implementation form of the first aspect, the scheduling information includes priority information for providing multiple selected group members with a priority for access to the RA resources.

The priority access can provide the selected group members with at least a higher probability to access RA resources than the not selected group members. The priority information can be a predetermined order, according to which the RA resources are distributed to the selected group members. The priority information can take into account the respective position of the group members, the type of the group members, and/or a distance of the group members to the central unit, and/or a reliability of the group members e.g. known from previous events. The ordered scheduling can prevent signaling congestion and overload of the central unit.

In a ninth implementation form of the method according to the eighth implementation form of the first aspect, it is determined by each group member whether it is a selected group member, and the RA resources are accessed by each group member according to the priority information.

Each group member is configured to carry out the determination. Thereby, the method of the present invention can be carried out effectively in each device group.

In a tenth implementation form of the method according to the seventh, eighth or ninth implementation form of the first aspect, at least one RA preamble sequence is reserved for the at least one selected group member.

In an eleventh implementation form of the method according to the first aspect as such or according to any of the previous implementation forms, the RA resources and/or physical uplink resources are assigned by the central unit to the at least one group representative and/or the group members.

Scheduling of the RA resources reduces signaling congestion as explained above. Scheduling of the physical uplink resources further enables transmission of diverse messages of a plurality of group members without the risk of overloading the central unit.

In a twelfth implementation form of the method according to the first aspect as such or according to any of the previous implementation forms, at least one group member is assigned by the central unit statically or dynamically as the at least one group representative.

A static assignment can, for instance, be predetermined, and can be carried out fast and without much load at both the central unit and the group representatives. A dynamic assignment provides more flexibility to the method. In particular, group representatives can be changed when needed, for example, in case of expectation of different events, in case certain group members are deemed to be more reliable to a certain event, or when a current group representative is found to be unreliable or even defective.

A second aspect of the present invention provides a system for organizing RA resources. The system comprises a central unit; at least one device group including a plurality of group members and at least one group representative; wherein the at least one group representative is provided with priority access to RA resources; the at least one group representative is configured to send a primary event message to the central unit in said RA resources; and the central unit is configured to send, responsive to the primary event message, a response message to the group members for managing access of the group members to the RA resources.

The system of the present invention can achieve the same advantages as described above for the method of the present invention. According to the various implementation forms described above for the method, also the system can be provided with the corresponding implementation forms.

A third aspect of the present invention provides a central unit for organizing RA resources. The central unit comprises a controller for providing at least one group representative of at least one device group with priority access to RA resources for sending a primary event message to the central unit, the at least one device group including the at least one group representative and a plurality of group members; a receiver for receiving the primary event message from the at least one group representative; and a transmitter for sending, responsive to the primary event message, a response message to the group members for managing access of the group members to the RA resources.

The use of a central unit of the present invention can achieve the same advantages as described above for the method and system of the present invention, respectively. According to the various implementation forms described above for the method, also the central unit can be provided with the corresponding implementation forms.

BRIEF DESCRIPTION OF DRAWINGS

The above aspects and implementation forms of the present invention will be explained in the following description of specific embodiments in relation to the enclosed drawings, in which:

FIG. 1 shows the scheme of an RA procedure according to state of the art, carried out between a device and a base station, and shows the occurrence of a signaling congestion caused by a collision between multiple devices carrying out the first step of the RA procedure;

DETAILED DESCRIPTION

The present invention provides a method for coordinating RA resources and corresponding signaling processes within a system, which preferably includes a plurality of devices and at least one central unit. For example, the system is at least a part of a network, and the at least one central unit is at least one network base station. The system particularly comprises related devices, e.g. a group of M2M devices. These M2M devices may require simultaneous access to RA resources, i.e. may simultaneously send a signaling request each to the same central unit. Therefore, a potential risk of signaling congestion and overload of the network, particularly at the at least one central unit, arises.

Figure 3:
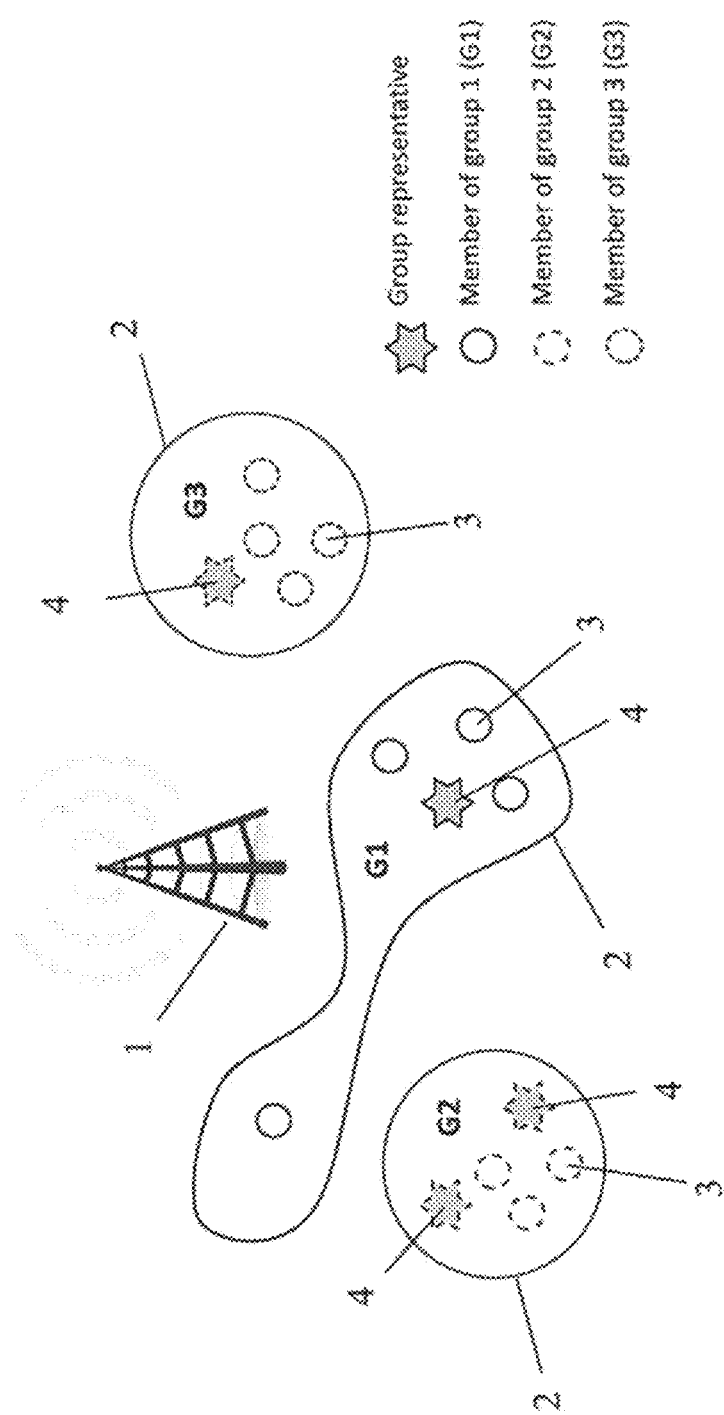
FIG. 3 shows the step of forming device groups including at least one group representative and multiple group members in a system of the present invention.

As shown in FIG. 3, according to the present invention, the plurality of devices is grouped into at least one device group 2. A device group 2 preferably contains at least one group representative 4 and a plurality of group members 3. The at least one group representative 4 can be one of the plurality of devices, but can also be another dedicated device with e.g. different abilities. The grouping into the at least one device group 2 can be performed statically or dynamically, for example, by the central unit 1. Preferably, the devices are assorted into a plurality of device groups 2 based on different metrics and/or features of the devices, for instance, based on a service type of the devices, proximity of the devices to the central unit 1, a mobility of the devices, or the like. Thus, a batch of similar behaviors can be handled in a single shot.

Figure 2:
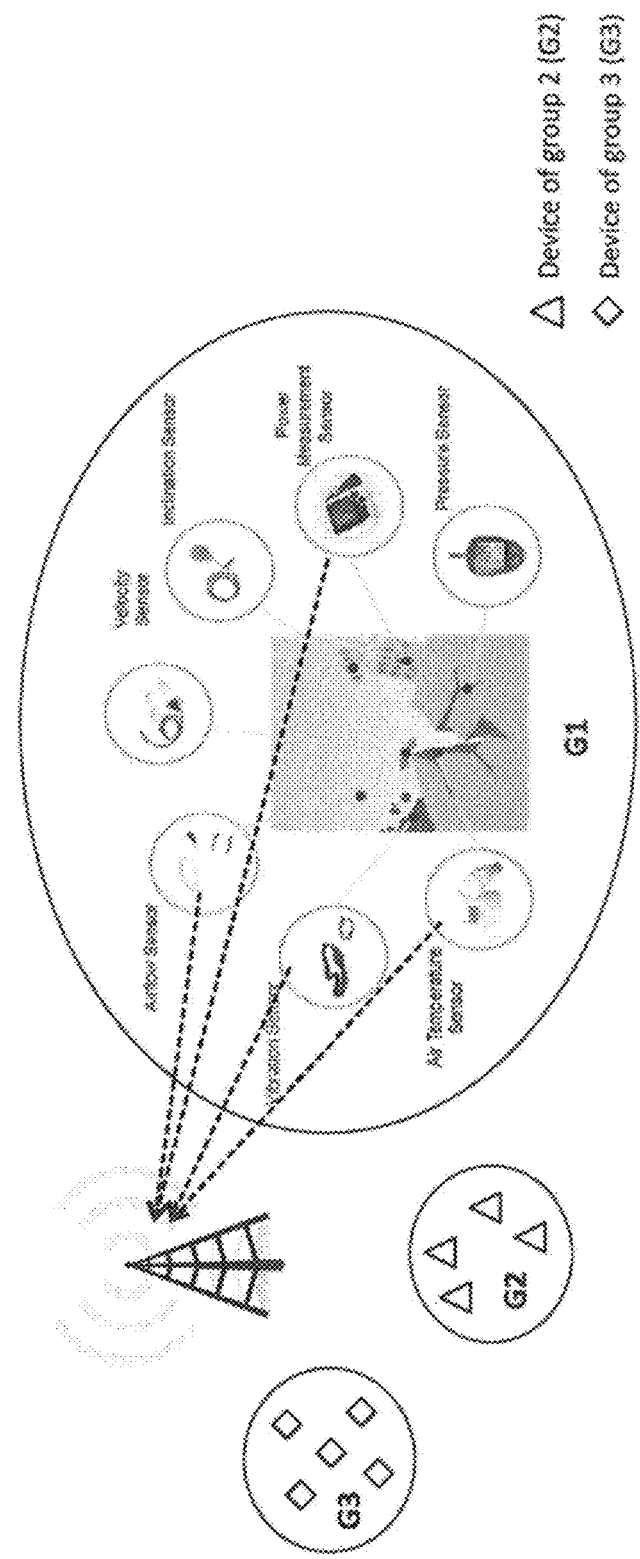
FIG. 2 shows the simultaneous behavior of a plurality of devices in the exemplary case of an earthquake detection system.

FIG. 2 shows specifically an example of a system, which functions as an earthquake detection system, and includes a number of seismic-related devices. These seismic-related devices are placed in an earthquake-prone region, in order to provide anti-seismic capacity. Anti-seismic capacity can, for example, be provided by sensors configured to measure earth surface tension, vibration, pressure, airflow, velocity, inclination, power, and/or air temperature. In case of an earthquake, a multiple or even all devices (sensors) may simultaneously observe an abnormal behavior, and may thus almost simultaneously start initiating a network access, i.e. access to the central unit, in order to report their status. Due to the simultaneous signaling of the devices, the central unit can become overloaded. However, since, according to the present invention, devices, which exhibit highly correlated behavior in case of e.g. an earthquake, are grouped together, they can then be dealt with as a whole. In FIG. 2, the earthquake detection devices are in a device group labeled with G1. Other device groups are labeled with G2 and G3, respectively.

Also in FIG. 3 a plurality of devices is grouped into three device groups 2 (G1, G2 and G3). Each device group 2 contains multiple group members 3 shown as circles in FIG. 3. Preferably, the group members 3 of each device group 2 serve the same application, whereas the group members 3 of different device groups 2 serve different applications. For example, the first device group 2 (G1) may consist of the above-described measuring sensors for earthquake detection, being illustrated in FIG. 2, the second device group 2 (G2) may contain devices, which are attached to one and the same vehicle, and the third device group 2 (G3) may be formed by monitoring devices, which are provided inside one and the same building.

After grouping the devices into at least one device group 2, one or several of the devices among the group members 3 of each device group 2 are assigned as one or more group representatives 4 shown as a star in each device group 2 in FIG. 3. A group representative 4 can be a selected one of the group members 3, or can be a specific device. The group representative can, for example, be a device, which is in better condition concerning its role in the service. For instance, the group representative 4 can have a better radio link quality, a better device capacity, and/or a better battery life than the group members 3. An example for a group representative 4 is a heart rate sensor attached to a patient, who has a heart disease. Another example for a group representative 4 is a device, which is located in close proximity of the central unit 1, and/or has a better radio link quality and/or is a metering device, which has longer battery life. Alternatively, a group representative 4 can be a device, which is directly connected to a charger.

For the step of grouping the devices into at least one device group 2 and/or for the step of assigning the at least one group representative 4, additional information, e.g. context information, of the devices should be timely updated and notified to the central unit 1 of the network. Suitable mechanisms for grouping devices into device groups and selecting at least one group representative per device group are known from the prior art, for example, from US 2013/0029716 A1.

According to an embodiment of the present invention, each group representative 4 of each device group 2 is provided with a priority access to available RA resources. Priority access to RA resources means that the at least one group representative 4 has a higher possibility than the group members 3, preferably the highest possibility of all devices, more preferably even a guarantee of obtaining RA resources for sending an event message to the central unit 1, when an event occurs among all group members 3 or a part of the group members 3.

Figure 4:
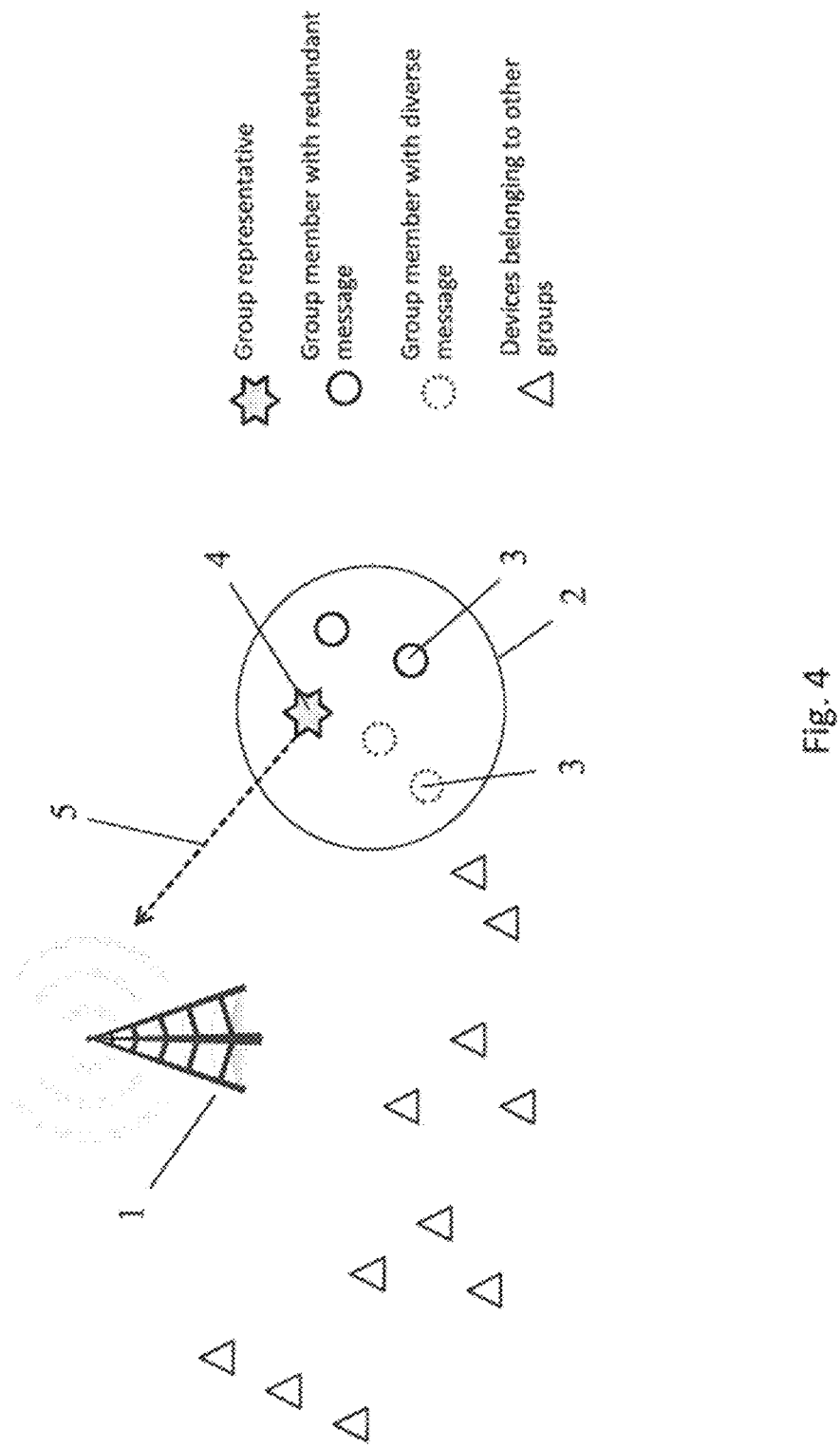
FIG. 4 shows the step of sending a primary event message in the RA resources by the at least one group representative in the system of the present invention.

The case after an event has occurred is shown in FIG. 4. In FIG. 4 a device group 2 is shown, which includes one group representative 4. The group representative 4 sends a primary event message 5 in said obtained RA resources to the central unit 1. The device group 2 shown in FIG. 4 further includes group members 3 with redundant messages (shown as solid circles), e.g. with messages to be sent to the central unit 1 having the same content as the primary event message 5, and group members 3 with diverse messages (shown as dotted circles), e.g. with messages to be sent to the central unit 1 having a different content than the primary event message 5. FIG. 4 also illustrates other devices (shown as triangles), which belong to one or more other device groups 2, or which may not be grouped at all. The event can, for example, be a heart attack of a person, and the group representative 4 sending the primary event message 5 can accordingly be a pulsimeter. The event can also be a fire, and the group representative 4 sending the primary event message 5 can accordingly be a smoke detector, which is provided close to a vent-pipe. By means of analyzing the primary event messages 5 received from one or more group representative 4, the central unit 1 can be well informed of the event.

Preferably, a predetermined amount of the RA resources, e.g. certain RA preamble sequences, is reserved for the at least one group representative 4, in order to provide the at least one group representative 4 with the priority access. The at least one group representative 4 is preferably configured to send the primary event message 5 in these RA resources, in case that an event occurs. Additional data describing the ongoing event can be additionally attached by the at least one group representative 4 to the primary event message 5.

The additional data can, for example, include relevant messages, which the at least one group representative 4 captures from group members 3 in its neighborhood, preferably from group members 3 of its device group 2. The additional data can be a secondary event message, which a group member 3 triggered by the event attempts to send. The secondary event message can correspond to the above-mentioned redundant message or diverse message. That means, the secondary event message can correspond to or differ from the primary event message 5. Preferably, the at least one group representative 4 adds only a secondary event message that is a diverse message to the primary event message 5. For capturing the relevant messages from group members 3, the at least one group representative 4 may have the ability to detect preferably each secondary event message sent respectively from the group members 3. This ability can either be realized merely by listening of the at least one group representative 4 to the uplink channel of each group member 3. For instance, if the at least one group representative 4 is located in a central position of the device group 2, it may be easy to listen to secondary event messages sent from multiple group members 3 located in the surrounding area. Alternatively, one or more additional dedicated communication interfaces, for example, air interfaces, like ZigBee, Wifi or Bluetooth, can be provided, in order to carry out Device-to-Device (D2D) communications between the at least one group representative 4 and the group members 3 of the device group 2, particularly if all the group members 3 are located in proximity. The at least one group representative 4 can forward one, some or all of the detected secondary event messages to the central unit 1, so that RA resource allocation may be better organized and scheduled. For instance, the at least one group representative 4 can attach one or a plurality of secondary event messages, which it detects from one or a plurality of group members 3, to the primary event message 5.

Figure 5:
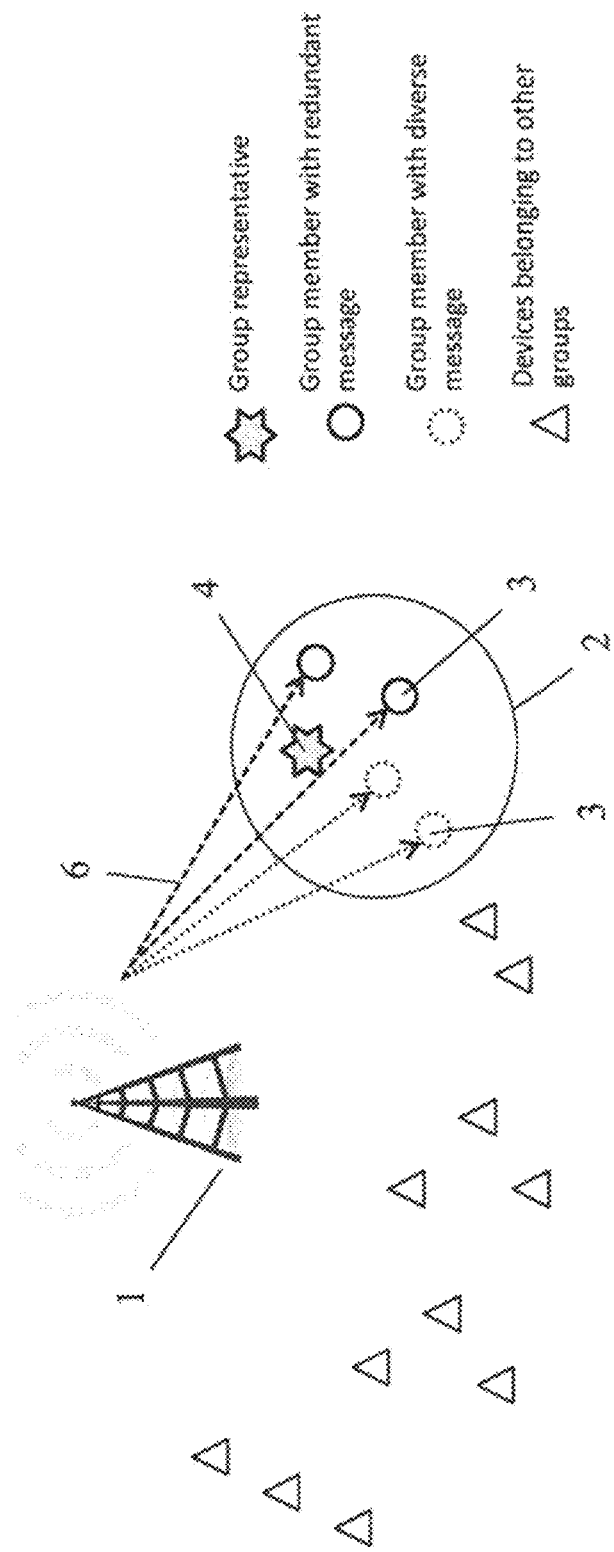
FIG. 5 shows the step of sending a response message to group members by the central unit in the system of the present invention.

The central unit 1 can extract sufficient information about the event occurring to the whole device group 2 from the at least one primary event message 5 received from the at least one group representative 4. After receiving a primary event message 5 from at least one group representative 4, the central unit 1 sends a response message 6 to the group members 3 of the at least one device group 2, as shown in FIG. 5. The response message 6 is sent for managing access of the group members 3 to the RA resources. The central unit 1 can send the same response message 6 to group members 3 with a redundant message and to group members 3 with a diverse message, respectively. However, the group representative 4 can also send different response messages to group members 3 with a redundant message and to group members 3 with a diverse message, respectively. Preferably, the central unit 1 broadcasts the response message 6, and preferably includes the received primary event message 5 in the response message 6. The response message 6 may further include service type information and other relevant information, which can better describe the event. For example, one or more secondary event messages, which the at least one group representative 4 has detected from one or more group members 3 and has transmitted to the central unit 1, can be included in the response message 6.

In the example of the earthquake detection system, in case an earthquake happens, for instance a vibration sensor, which is assigned as a group representative 4, is triggered and starts requesting access to RA resources, in order to send in the RA resources a report of the occurring event as the primary event message 5 to the central unit 1. Thereby, the vibration sensor has priority access to RA resources, i.e. at least a higher probability than group members 3 to obtain RA resources, and uses preferably dedicated RA resources explicitly reserved for group representatives 4. Meanwhile, other group members 3 may also be triggered by the same event, and may desire to send secondary event messages. Thus, the group members 3 may also request access to RA resources. The other group members 3 can, in the present example, be pressure sensors and/or airflow sensors, which are located in the neighborhood of the vibration sensor. The secondary event messages may be detected by the vibration sensor, either through pure listening or through specific D2D channels, as described above. After receiving the primary event message 5 from the vibration sensor, the central unit will send a response message 6 as a broadcast-message, a multi-message or one or more uni-messages to the group members 3, wherein the response message 6 includes preferably both the primary event message 5 and other information describing, for example, the pressure status as well as the airflow condition concerning the device group 2.

Upon receiving the response message 6, the group members 3 preferably perform a redundancy check, in order to determine, whether the secondary event messages, which they desire or are attempting to send to the central unit 1, are redundant messages and/or are of the same information type than the primary event message 5. If said determination yields a positive result, i.e. if a secondary event message is found to be redundant by a group member 3, said group member 3 will stop requesting access to RA resources to the central unit 1. For example, said group member 3 may stop requesting access to RA resources to the central unit 1, if its secondary event message corresponds to the primary event message 5 and/or is included in the response message 6 of the central unit 1. In other words, the group members 3 are informed that the secondary event messages, which they desire to send to the central unit 1, have already been received at the central unit 1. In this way, unnecessary recurring transmissions of the redundant messages can be effectively avoided.

In the example of the earthquake detection system, the response message 6, which is sent by the central unit 1 to the group members 3, indicates that the central unit 1 has been informed about the earthquake. When the response message 6 is received at the group members 3, e.g. at the pressure and airflow sensors, these devices go through the redundancy check and determine, whether it is necessary to transmit own secondary event messages. All group members 3, which are trying to send redundant messages and/or messages of the same type to the central unit 1, such as vibration sensors in a proximate area of the group representative 4, stop requesting access to RA resources for communicating with the central unit 1, and rather keep silent until called by the central unit 1 or until triggered by another event.

Preferably, when the occurrence of an event is reported to the central unit 1, a set of group members 3 can furthermore be selected based, for example, on the information content of the received primary event message 5. These selected group members are expected to report diverse messages to the central unit 1. A scheduling and assignment of RA resources can be performed at the central unit 1 for the expected diverse messages of the selected group members 3, and certain RA resources, e.g. RA preamble sequences, as well as, for example, PUSCH resources can be assigned to the selected group members 3. It is also possible that the central unit 1 performs scheduling and assignment of RA and PUSCH resources to the at least one group representative 4. Information describing the assignment and scheduling of the RA and PUSCH resources can be enclosed and sent in the response message 6 by the central unit 1. This scheduling information can include priority information for providing multiple selected group members 3 with a priority for accessing the RA resources. The priority information can include or be a priority order determining the order, by which the selected group members 3 access the assigned RA resources. The assigned RA or PUSCH resources are then preferably shared among the scheduled group members 3. The scheduled group members 3 can, for example, successively reuse the assigned resources once they are freed by the previous group members 3. Thereby, the group members 3 can either follow the priority order, or can follow some other criteria. In this way, the available RA and PUSCH resources can be efficiently used.

Figure 6:
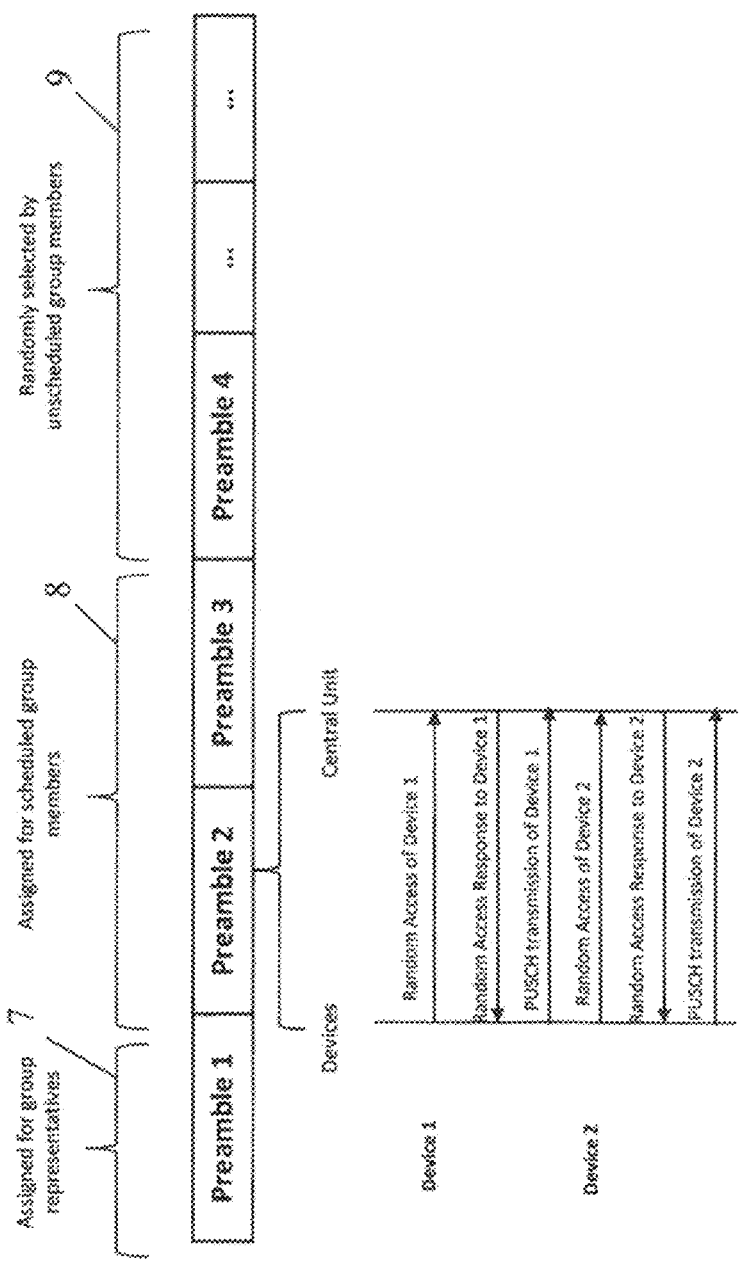
FIG. 6 shows an example for providing priority access to RA resources for at least one group representative and selected (scheduled) group members, and shows steps for the coordinated usage of the RA resources by the selected group members.

As shown in FIG. 6, suitable available RA resources can be RA preamble sequences. However, the present invention is not limited thereto. RA resources can also be realized differently, e.g. by specific bits or data fields. In FIG. 6 a part of the RA preamble sequences, i.e. at least one first RA preamble sequence 7, is reserved for the at least one group representative 4, labeled as "Preamble 1". Another part of the RA preamble sequences, i.e. at least one second RA preamble sequence 8, is assigned for selected, i.e. scheduled, group members 3, labeled as "Preamble 2" and "Preamble 3", respectively. The remaining part of the RA preamble sequences, i.e. at least one third RA preamble sequence 9, can be randomly selected by the not scheduled group members, which may be trying to send diverse messages, labeled with "Preamble 4" . . . . In the case shown in FIG. 6, two second RA preamble sequences 8, the "Preamble 2" and the "Preamble 3", are assigned RA resources for selected group members 3, wherein "Preamble 2" is a RA resource, which is supposed to be successively used by the group members 3 labeled "Device 1", "Device 2", and some further selected group members 3 following a priority order.

The "Device 1", which has the highest priority according to said priority order, first sends its RA request using the "Preamble 2" to the central unit 1, which is for example a base station. Thereafter, the "Device 1" receives a RA response from the central unit 1, wherein the RA response may include information about an assignment of PUSCH resources to the "Device 1". The "Device 1" will then report its diverse message using the assigned PUSCH resources, i.e. the "Device 1" will send a PUSCH transmission to the central unit 1. The diverse message, which is transmitted by the "Device 1" as a PUSCH transmission in the PUSCH resources to the central unit 1, can correspond to a secondary event message described above of "Device 1". Once the RA resources are released by the "Device 1", the "Device 2" will start its RA procedure, thereby reusing the same RA preamble sequence as "Device 1", i.e. in this case reusing the "Preamble 2", in order to send its RA request to the central unit 1. In response to its RA request, the "Device 2" then receives a RA response from the central unit 1, and can finally send its diverse message as a PUSCH transmission to the central unit 1. Thereby, the "Device 2" uses the same PUSCH resources, which the "Device 1" has used before. Further selected group members 3, which may follow after the "Device 1" and the "Device 2" in the priority order, will behave likewise in terms of RA procedure and PUSCH transmission.

In the example of the earthquake detection system, once the event is reported to the central unit 1, diverse messages from group members 3 such as an impact sensor, an airflow sensor, an inclination sensor and/or an air temperature sensor may be required in an earthquake control center, i.e. at the central unit 1. Therefore, a certain number of RA and PUSCH resources need to be arranged for the selected group members 3 during the scheduling process in the central unit 1. Information on these RA and PUSCH resources is preferably included in the response message 6, which is sent to the group members 3 together with the primary event message 5. When, for instance, a sensor for measurement of the pressure, airflow, inclination and/or air temperature receives the response message 6 from the central unit 1, said group member 3 merely needs to wait for its scheduled turn, and can use the assigned RA and PUSCH resources, once freed by the last group member 3 according to the priority order.

Figure 7:
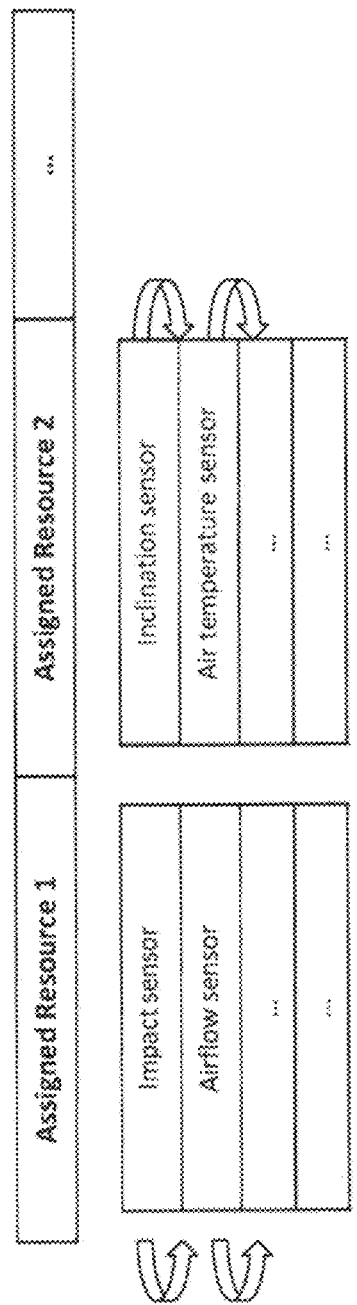
FIG. 7 shows assigned RA resource usage by selected group members following a priority order.

As shown in FIG. 7, "Assigned Resource 1" and "Assigned Resource 2" may illustrate assigned RA and/or PUSCH resources for the scheduled group members 3. For instance, "Assigned Resource 1" may be a RA resource supposed to be successively used by an impact sensor, an airflow sensor, and some other scheduled group members 3 following a certain priority order. The "Assigned Resource 2" may likewise be shared by an inclination sensor, an air temperature sensor, and some other selected devices following either the same or another priority order.

Group members 3, which have diverse messages to transmit, but do not find themselves in the scheduling information included in the response message 6 from the central unit 1, will reinitiate their request for access to RA resources to the central unit 1 immediately or after some back-off time, and will preferably use the rest of the RA resources, which are not yet pre-assigned to either the at least one group representative 4 or the at least one selected (scheduled) group member 3, in order to avoid collision.

Figure 8:
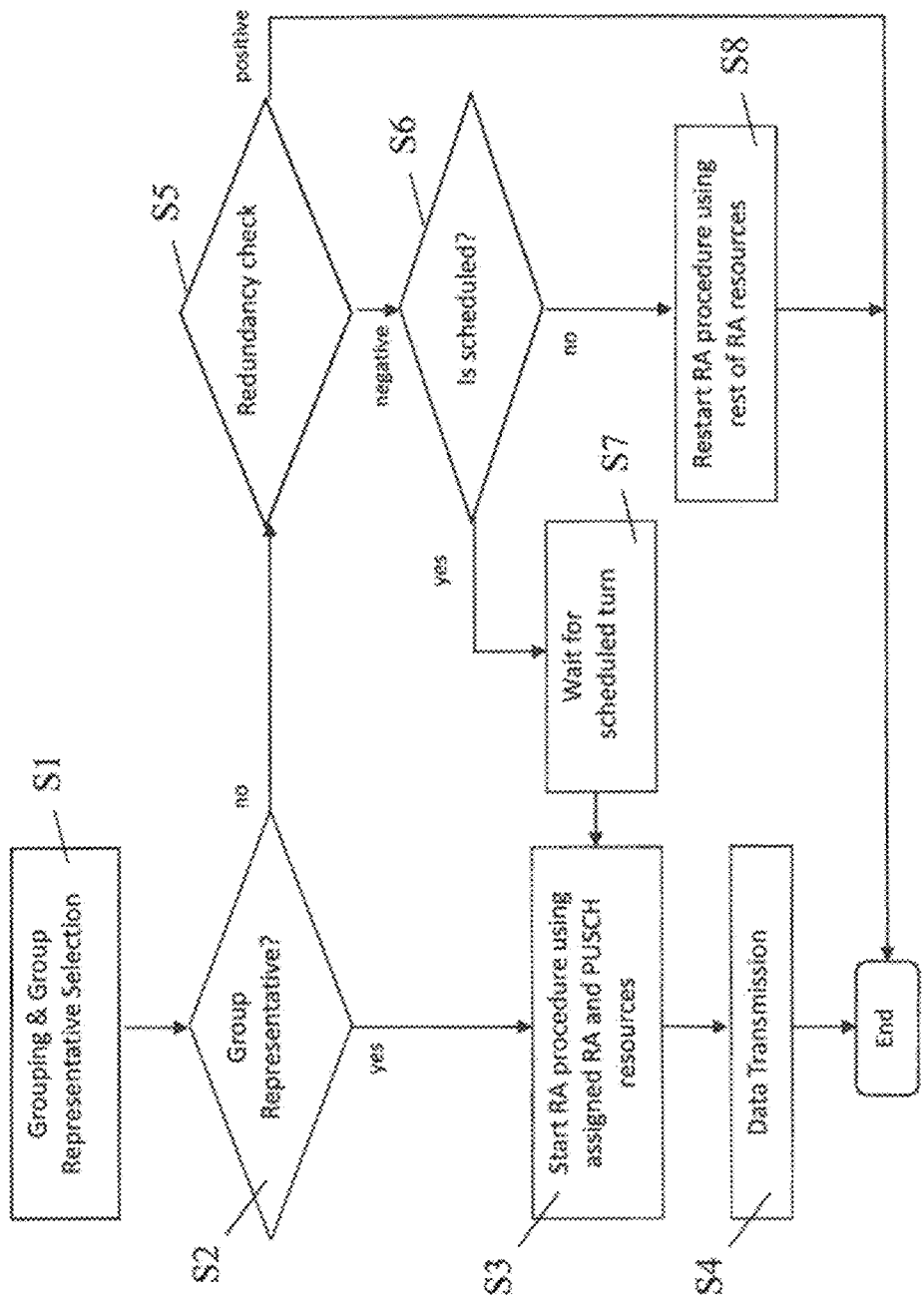
FIG. 8 shows a flow chart illustrating the method steps according to an embodiment of the present invention.

FIG. 8 shows a flow chart illustrating the method steps according to an embodiment of the present invention. In a first step S1, a plurality of devices, which may have simultaneous need of RA resources, are dynamically assorted into at least one device group 2. Thereafter, still in step S1, one or more group members 3 among each device group 3 are assigned as at least one group representative 4, as shown in FIG. 3. Preferably, the at least one group representative 4 has a certain advantage for the targeted service over the other group members 3. Certain RA resources are preferably reserved for the at least one group representative 4, in order to guarantee that the central unit 1 can have a good connection with a higher probability, preferably a guaranteed connection, with the at least one group representative 4, and can thus be well informed when an event occurs. If an event is triggered, the action of each device of the at least one device group 2 depends on whether the device is a group representative 4 or a group member 3. In case of an event, each device of a device group 2 may perform a self-check, in step S2, for determining, whether it is currently a group member 3 or a group representative 4. In the case of "yes" in step S2, a group representative 4 will initiate, in step S3, its RA procedure using priority access to RA resources, preferably using reserved RA and PUSCH resources, and will afterwards start its data transmission, in step S4, i.e. a transmission of a primary event message 5, as shown in FIG. 4. Upon receiving the primary event message 5 from said group representative 4, the central unit 1 will send a response message 6 including preferably the received primary event message 5 and further relevant information to the group members of said group representative 4, as shown in FIG. 5. A scheduling of RA and PUSCH resources is preferably also performed at the central unit 1 for diverse messages expected from certain group members 3, and the assignment and scheduling information are preferably enclosed in the response message 6.

In the case of "no" in step S2, a group member 3, i.e. a device which is not chosen as a group representative 4, will go through a redundancy check, in step S5, when it receives the response message 6 from the central unit 1. The redundancy check is carried out to determine, whether it is necessary to transmit an own second event message. Each group member 3 that finds that it is not necessary to transmit an own secondary event message ("positive" in step S5), i.e. the redundancy check is positive, will stop requesting access to RA resources for communicating with the central unit 1, and will keep silent ("End") until triggered by another event. Each group member 3 that finds that it is still necessary to transmit an own secondary event message ("negative" in step S5), i.e. the redundancy check is negative, will perform another check, in step S6, for determining, whether it is one of the group members 3, of which diverse messages are expected by the central unit 1, and which the central unit 1 has scheduled based on either a priority order or some other criteria. Each group member 3 that finds itself, in step S6, from the response message 6 of the central unit 1 to be one of the selected, i.e. scheduled, group members 3 ("yes" in step S6), merely needs to wait for its scheduled turn, in step S7, and can then start its RA procedure according to step S3, and its transmission of a secondary event message, as explained above for step S4, using the assigned RA and PUSCH resources, respectively, once these resources are freed by the previous group member 3 according to the priority order or order based on some other criteria. Each group member 3 that finds itself to be not selected ("no" in step S6) and nevertheless has a diverse message to transmit to the central unit 1, will restart its RA procedure, in step S8, using the remaining RA resources, which are neither reserved by a group representative 4 nor assigned to any scheduled group member 3. Thereby, a collision of requesting for RA resources can be avoided with the at least one group representative 4 and the scheduled group members 3.

The method of the present invention is particularly useful for optimizing a M2M signaling procedure, in order to reduce a risk of signaling congestion and a probability of network overload, which may, for example, incur from integrating M2M communication to a cellular mobile network. The method of the present invention can be widely applied to all kinds of existing devices, without special requirements and limitation on the distance between the group members. No additional air interface between the group members is needed. Following the scheme of the present invention, a signaling congestion probability incurred from a large number of M2M devices, which are triggered simultaneously, can be significantly reduced, because unnecessary retransmissions can be effectively avoided. Also the amount of network signaling can be greatly reduced with an efficient internal scheduling mechanism carried out preferably by the central unit. The described RA resource organization scheme can optimize the use of available RA resources, and thus can greatly improve the efficiency of management in performing a service for a plurality of M2M devices.

The present invention has been described in conjunction with various embodiments as examples as well as implementations. However, other variations can be understood and effected by those skilled in the art in practicing the claimed invention, from the study of the drawings, the disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for organizing random access (RA) resources, the method comprising:
   forming a device group including a plurality of group members and at least one group representative;
   providing the at least one group representative with priority access to RA resources;
   sending, by the at least one group representative, a primary event message to a central unit in the RA resources;
   sending, by the central unit, a response message, responsive to the primary event message, to the group members for managing access of the group members to the RA resources; and
   wherein at least one RA preamble sequence is reserved for the at least one group representative.

2. The method according to claim 1, wherein:
   a predetermined amount of the RA resources is reserved for the at least one group representative in order to provide the at least one group representative with the priority access.

3. The method according to claim 1, wherein:
   the response message includes the primary event message; and
   requesting access to the RA resources for sending a secondary event message is stopped by a group member if the secondary event message corresponds to the primary event message.

4. A method for organizing random access (RA) resources, the method comprising:
   forming a device group including a plurality of group members and at least one group representative;
   providing the at least one group representative with priority access to RA resources;
   sending, by the at least one group representative, a primary event message to a central unit in the RA resources;
   sending, by the central unit, a response message, responsive to the primary event message, to the group members for managing access of the group members to the RA resources;
   wherein:
   the response message includes the primary event message; and
   requesting access to the RA resources for sending a secondary event message is stopped by a group member if the secondary event message corresponds to the primary event message.

5. The method according to claim 4, wherein:
   a redundancy check is performed by each group member in order to determine whether the secondary event message is redundant with or is of the same type as the primary event message; and
   requesting access to the RA resources is stopped by a group member if its redundancy check is positive.

6. The method according to claim 4, wherein:
   a predetermined amount of the RA resources is reserved for the at least one group representative in order to provide the at least one group representative with the priority access.

7. A method for organizing random access (RA) resources, the method comprising:
   forming a device group including a plurality of group members and at least one group representative;
   providing the at least one group representative with priority access to RA resources;
   sending, by the at least one group representative, a primary event message to a central unit in the RA resources;
   sending, by the central unit, a response message, responsive to the primary event message, to the group members for managing access of the group members to the RA resources;
   wherein:
   at least one secondary event message from at least one group member is detected by the at least one group representative, and the at least one secondary event message is attached by the at least one group representative to the primary event message;
   the response message includes the primary event message and the at least one secondary event message; and
   requesting access to the RA resources for sending a secondary event message is stopped by a group member, if its secondary event message is included in the response message.

8. The method according to claim 7, wherein:
   the at least one secondary event message of the at least one group member is listened to by the at least one group representative; or the at least one secondary event message is detected by the at least one group representative via dedicated communication interfaces between the at least one group representative and the group members.

9. The method according to claim 7, wherein:
a predetermined amount of the RA resources is reserved for the at least one group representative in order to provide the at least one group representative with the priority access.

10. A method for organizing random access (RA) resources, the method comprising:
   forming a device group including a plurality of group members and at least one group representative;
   providing the at least one group representative with priority access to RA resources;
   sending, by the at least one group representative, a primary event message to a central unit in the RA resources;
   sending, by the central unit, a response message, responsive to the primary event message, to the group members for managing access of the group members to the RA resources;
   wherein the response message includes scheduling information for scheduling at least one selected group member for access to the RA resources;
   wherein the scheduling information includes priority information for providing multiple selected group members with a priority for access to the RA resources; and
   wherein each group member determines whether it is a selected group member, and the RA resources are accessed by each group member according to the priority information.

11. A method for organizing random access (RA) resources, the method comprising:
   forming a device group including a plurality of group members and at least one group representative;
   providing the at least one group representative with priority access to RA resources;
   sending, by the at least one group representative, a primary event message to a central unit in the RA resources;
   sending, by the central unit, a response message, responsive to the primary event message, to the group members for managing access of the group members to the RA resources;
   wherein the response message includes scheduling information for scheduling at least one selected group member for access to the RA resources;
   wherein at least one RA preamble sequence is reserved for the at least one selected group member.

12. A system for organizing random access (RA) resources, the system comprising:
   at least one device group including a plurality of group members and at least one group representative, wherein the at least one group representative is provided with priority access to RA resources and is configured to send a primary event message to the central unit in the RA resources;
   a central unit configured to send, responsive to the primary event message, a response message to the group members for managing access of the group members to the RA resources; and
   wherein at least one RA preamble sequence is reserved for the at least one group representative.

13. A central unit for organizing random access (RA) resources, the central unit comprising:
   a controller for providing at least one group representative of at least one device group with priority access to RA resources for sending a primary event message to the central unit, the at least one device group including the at least one group representative and a plurality of group members;
   a receiver for receiving the primary event message from the at least one group representative;
   a transmitter for sending, responsive to the primary event message, a response message to the group members for managing access of the group members to the RA resources; and
   wherein at least one RA preamble sequence is reserved for the at least one group representative.

* * * * *